United States Patent Office 3,422,869
Patented Jan. 21, 1969

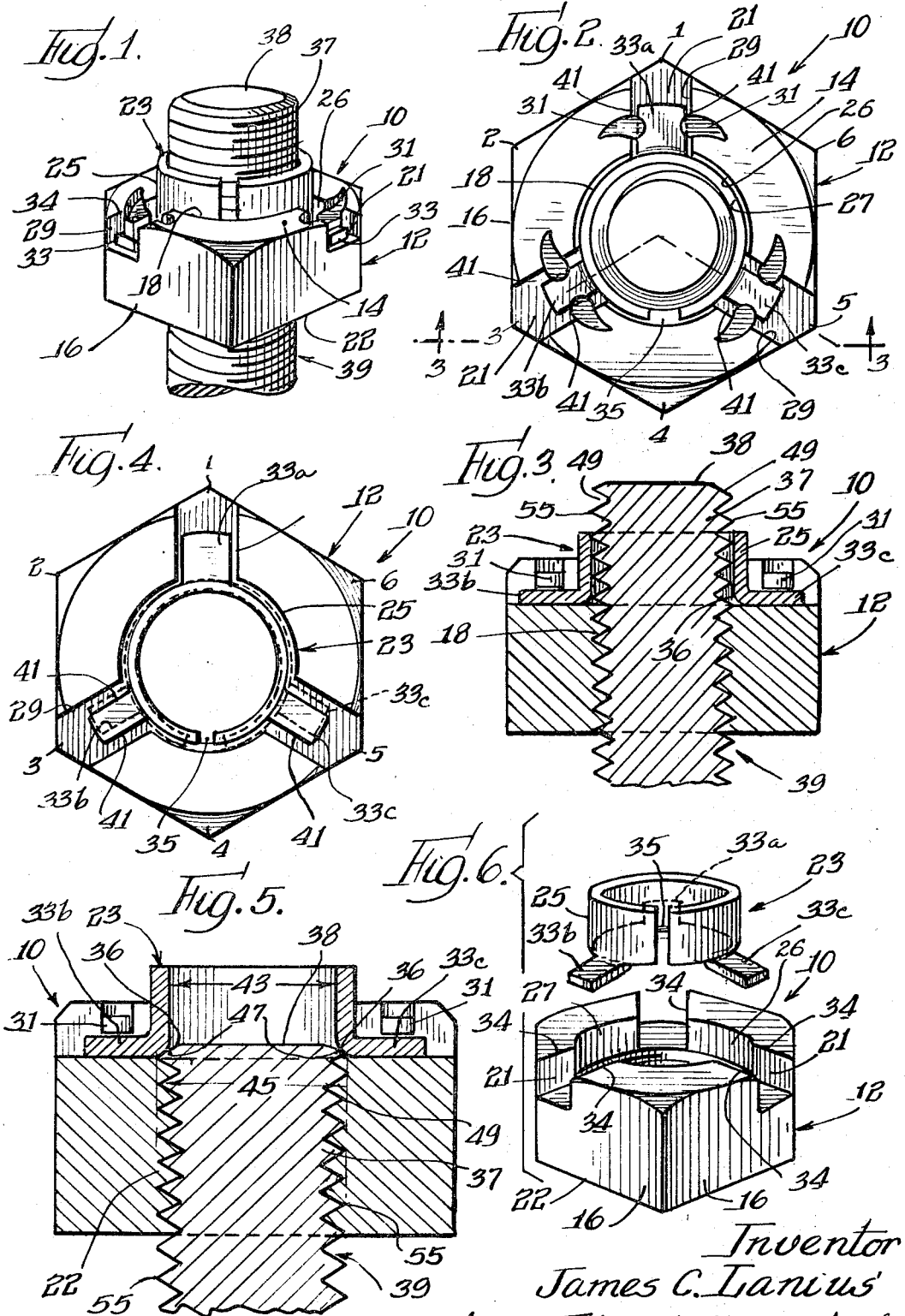

3,422,869
LOCKING TYPE NUT
James C. Lanius, Jr., Elgin, Ill., assignor to Illinois Tool
Works Inc., Chicago, Ill., a corporation of Delaware
Filed Oct. 9, 1967, Ser. No. 673,720
U.S. Cl. 151—30          7 Claims
Int. Cl. F16b 39/38

ABSTRACT OF THE DISCLOSURE

A locking type nut comprising a body portion having a threaded aperture therethrough, and a discontinuous cylindrical shaped, expandable ring member attached to the body portion in axial alignment with the aperture. Upon receiving a mating bolt the ring member will be caused thereby to expand to grip the threaded end of the bolt in locking fashion.

Background of the invention

This invention relates to thread gripping lock type nuts.

Many of the varieties of lock nuts in use today are of the type which when mated with a threaded bolt tend to deform the threads of the bolt, and/or the nut in order that the two may be adequately locked together. Consequently, this type of lock nut may be used only once; if it becomes necessary to remove a lock nut of this type from a bolt to which it is fastened, either the bolt or nut, or both must be replaced. Another commonly used lock nut is the type having a plastic insert which, when being fastened to a threaded bolt, is cut thereinto by the turning threads of the bolt and thereby grips the threads to lock the nut thereon. This type of lock nut while providing an adequate grip on the bolt to which it is fastened, has the disadvantage that at high temperatures the plastic insert may be damaged or destroyed, thus reducing the gripping ability of the nut.

Summary of the invention

Accordingly, it is a general object of this invention to provide a new and improved locking type nut.

It is a further object of this invention to provide a locking type nut which when used causes no undue damage to its threads or those of a mating bolt, and which therefore may be reused with minimal loss of torque or gripping ability.

It is another object of this invention to provide a locking type torque nut of an all metal construction, the gripping ability of which will not be affected by temperature.

Briefly, this invention provides a new and improved all metal lock nut which includes a discontinuous spring sheet metal cylinder or brake band, for tightly gripping the threads of a mating bolt without damaging the latter, and in which the torque range or grip thereof on a mating bolt can be varied by increasing or decreasing the thickness of, or by varying the height of, the spring steel brake band included therein.

Brief description of the drawings

The above and other objects and features of the invention will become more apparent from a consideration of the accompanying drawings wherein:

FIG. 1 is a perspective view of a lock nut according to the invention shown in engagement with the threaded end of a mating bolt;

FIG. 2 is a plan view of the lock nut and bolt of FIG. 1 of the drawings;

FIG. 3 is a view of the lock nut and mating bolt arrangement of FIG. 2 taken along the line 3—3;

FIG. 4 is a top view of a lock nut according to the invention showing in solid lines the gripping member of the lock nut before, and in dotted lines after the engagement thereby of the threaded end of a mating bolt;

FIG. 5 is a side sectioned view of a lock nut according to the invention, receiving therein the threaded end of a mating bolt; and FIG. 6 is an exploded perspective view of a lock nut according to the invention.

Detailed description

Referring now in greater detail to the drawings, FIGS. 1 and 2 thereof show a preferred embodiment of a lock nut 10, according to the invention, comprising an hexagonally shaped body portion 12. As can be seen in FIG. 2 of the drawings, at the odd numbered corners 1, 3 and 5 of body portion 12, there are located indentations or grooves 21 in the upper or trailing end or face 14 thereof. These indentations, as can be seen in FIG. 1, extend down along sides 16 of the body portion 12, and from the sides 16 radially inwardly to the threaded side portion 18 of the nut. The purpose of the indentations 21 is to receive the lateral tabs 33a, 33b, and 33c of an unthreaded discontinuous cylindrically or ring shaped spring steel gripping member or brake band 23, of which a cylindrical portion 25 thereof is received in a counterbore 26 formed in face 14 of the nut, concentrically with the center aperture 27 of body portion 12, the diameter of the counterbore 26 being larger than the outside diameter of the ring. To secure the sheet metal ring member 23 in counterbore 26 of body portion 12, the junctions 34 of the side walls 29 of indentation 21 and trailing end 14 of body portion 12 are caused to be deformed, preferably by a process called "staking." This provides protrusions 31 which extend into indentations 21 from both side walls 29 respectively thereof above lateral tabs 33a, 33b and 33c, respectively. By means of protrusions 31, ring member 23 is held substantially immovable in an axial direction in counterbore 26 of body portion 12. However, because of the spacing between the sides 41 of the lateral tabs 33b and 33c and the side walls 29 of respective indentations 21, the tab members 33b and 33c remain free to move about within the latter. Thus, as a mating bolt, such as 39 is tightened into the nut 10 from leading end 22 thereof, the ring member 23 will not be forced from the body portion of the nut but instead, as will be explained again below, will arcuately expand at gap 35 thereof to grip a plurality of the threads of the bolt in locking fashion. It should be noted that while the locking nut illustrated in the drawings is hexagonally shaped and the ring member thereof includes three lateral securing tabs which are received in grooves located in the alternate corners of the hexagon, the invention is not limited to this particular shape or structure.

Looking now at FIG. 3 of the drawings, which is a sectioned view along the line 3—3 of the lock nut-bolt arrangement of FIG. 2, the gripping relation of the cylindrical band 25 of ring member 23 with the crests 55 of a plurality of the threads of end 37 of bolt 39 can be clearly seen. It will be noted that the junction area 36 between each of the lateral tabs and the cylindrical portion 25 of ring member 23 is round in shape. These rounded areas 36 provide, as will be shown below, camming surfaces which, when engaging the leading tip 38 of bolt 39, aid in the urging of the expansion of ring member 23 about the threaded end 37 of bolt 39.

FIG. 4 of the drawings illustrates in greater detail the ring member 23 in its normal and gripping states. The solid lines show the spring member 23 in its normal state; i.e. before receiving a threaded bolt, and the dotted lines show the spring member 23 after receiving a threaded bolt. As can be seen both in FIG. 4 and in FIG. 2 of the drawings, tabs 33b and 33c, which are located on either side of gap 35 of ring member 23, are of a narrower construction than tab 33a thereof. The reason for this is that upon engagement with a mating bolt, ring member 23 will be forced to expand so as to grip the threads of the bolt, and as the expansion takes place at gap 35 of discontinuous ring member 23, lateral tabs 33b and 33c will be moved laterally within a respective groove 21 from the position shown in solid lines to the position shown in dotted lines, while tab 33a which is fitted relatively tightly into a respective indentation 21, will, in comparison to tabs 33b and 33c, remain nearly stationary. In order to move as described, additional space between the ends 41 of the tabs 33b and 33c and side walls 29 of corresponding indentations 21 is required. This requirement is met through the narrow construction of tabs 33b and 33c. It is also possible to widen the indentation 21 into which tabs 33b and 33c are fitted, but this would tend to weaken the structure of the nut. Further, it would also be possible to form tab 33a so as to have the same width as tabs 33b and 33c; this, however, would allow excessive rotation of the ring member and would thus permit an undesirable amount of "play" between the body portion 12 and ring member 23 of nut 10.

With reference now to FIG. 5 of the drawings, there is shown the nut 10 about to receive bolt 39. As can be seen, the inside diameter 43 of ring member 23 of nut 10 in its normal state is considerably less than the major diameter 45 of the threaded bolt 39. Thus, it follows that upon the entering of bolt tip 38 into ring member 23, the rounded area 36, as mentioned above, through a camming action with edges 47 of tip 38 will aid in the urging of the separation of spring member 23. As the edges 47 slide along areas 36 of ring member 23, the discontinuous ring member will begin to separate at gap 35 thereof, as shown in FIG. 4 of the drawings, until the inside diameter 43 of the ring becomes opened to a size substantially equal to the outside diameter of the threads of bolt 39. However, because the ring member is of resilient, sheet metal material, it tends to tightly grip in a brake band fashion; i.e. in a compressive manner, against the crests 55 of the threads of bolt 39. In this way, the nut will become locked to bolt 39 wherever the tightening thereof is discontinued.

While there is a frictional force applied by the brake band member 23 to a plurality of the threads 49 of the bolt as the bolt is tightened into the nut, no undue damage occurs to the threads and therefore the bolt and nut, once separated, may be used again.

FIG. 6 of the drawings illustrates a lock nut 10 prior to the assembling of ring member 23 and body portion 12 thereof. As can be seen in the figure, lateral tabs 33b and 33c will be placed into indentations or grooves 21 in body portion 12, while the cylindrical portion of ring member 23 will be positioned in counterbore 26, which is formed concentrically with central opening 27. As explained above, subsequent to the positioning of the ring member into the body portion of the nut, the edges 34 of the indentation 21 are deformed or "staked" to secure the ring member from axial movement in the body portion.

Ring member 23 is preferably fashioned from spring steel which will apply a compressive force about the threaded end of a mating bolt sufficient to lock the nut and bolt together while not causing undue damage to the threads or crests of the bolt. Furthermore, because the ring member and body portion are both of a metallic material, they can withstand high temperatures without becoming misshapen and, in the case of the ring member, without losing its resiliency.

The lock nut 10 of the drawings is shown with the resilient spring member 23 having the cylindrical portion 25 extending outwardly from the body portion 12, beyond end 14 thereof. This arrangement will provide a predetermined gripping force or torque rating on the mating bolt. However, if it is necessary or desirable to reduce the torque or grip of the nut on the mating bolt, the height of the ring member may be reduced. Likewise, if an increase in torque or grip is required, the cylindrical portion 25 may be increased in height (as shown in the drawing). A reduction or increase in height of the sheet metal ring member 23 reduces or increases the number of threads which are gripped by the former, thus in turn reducing or increasing the overall locking torque of the nut to the mating bolt. Furthermore, a greater or lesser locking force may also be produced by increasing or decreasing, respectively, the thickness of the material of the ring member.

Thus, the instant invention provides a new and novel, reusable locking type nut which is both efficient and reliable.

It will be obvious to those skilled in the art that changes and modifications may be made without departing from this invention in its broadest aspects and therefore the aim in the appended claims is to cover all such changes and modifications as come within the true spirit and scope of the invention.

What is claimed is:

1. A lock nut for use with a bolt having a threaded end, said lock nut comprising a body portion having a threaded aperture therethrough and a counterbore formed in a first face of said nut, contiguous with said aperture, a resilient discontinuous cylindrical shaped ring member having a smooth walled bore, and means for securing said ring member to said body portion within said counterbore in axial alignment with said aperture, the diameter of said counterbore being greater than the outer diameter of said ring member and the inner diameter of said ring member being less than the major diameter of said threaded aperture, said means substantially rigidly securing said ring member at a point substantially opposite the point of discontinuity thereof as well as laterally movably securing said ring member on either side of said point of discontinuity, said ring member being expandable within said counterbore so that upon the insertion of the threaded end of said bolt therein, said ring member is urged thereby to expand at the point of discontinuity thereof to grip the threaded end of said bolt in locking fashion.

2. A lock nut as claimed in claim 1 wherein said body portion includes, in said one face, a plurality of spaced apart grooves each intersecting said counterbore and wherein said ring member includes a plurality of complementary tab members which are received in respective ones of said grooves in the face of said body portion, one of said tab members being located opposite the point of discontinuity of said ring member and being substantially rigidly secured in a respective groove and the other of said tab members being located on opposite sides of said point of discontinuity of said ring member and being laterally movably secured in the remaining respective grooves in said face of said body portion, thereby to allow for the expansion of said ring member at the point of discontinuity thereof upon the insertion into said ring member of the end of said bolt.

3. A lock nut as claimed in claim 2 wherein the area of said body portion along the edge of said grooves is deformed so as to provide protrusions extending into said grooves for securing said tab members therein.

4. A lock nut as claimed in claim 2 wherein said tab members extend from one end of said ring member, wherein the areas of joinder of said tab members to said ring member are rounded in shape to provide a camming surface such that upon the insertion of the threaded end of said bolt in said ring member, said bolt slidably passes over said camming surfaces causing the expansion of said ring member, and wherein said ring member grips the crests of the threads of the threaded end of said bolt in locking fashion.

5. A lock nut as claimed in claim 1 wherein said ring member is formed of a sheet metal material and wherein said ring member extends outwardly from said aperture, a predetermined distance beyond the face of said body portion, thereby to provide a grip on a corresponding number of threads on the end of said bolt.

6. A lock for use with a bolt having a threaded end, said lock nut comprising a hexagonally shaped body portion having a leading end and a trailing end with a threaded aperture extending therethrough from said leading end to said trailing end, said trailing end of said body portion including a counterbore contiguous with said threaded aperture and a radial groove at each of the alternately spaced corners of the hexagonally shaped face thereof intersecting said counterbore, and a resilient, cylindrical shaped, sheet metal ring member having a single longitudinal slot throughout the axial extent thereof and including a smooth walled bore and three laterally outwardly extending tab members at one end thereof, two of said tab members being located on either side of the slot of said ring member and being of a predetermined size, the third tab member being located substantially opposite to said slot and being larger in size than said other two tab members, the radially innermost areas of joinder of said three tab members with said ring member being rounded in shape, said ring member being received in said counterbore with said tab members being received in the three grooves, respectively, in said trailing end of said body portion, the diameter of said counterbore being greater than the outer diameter of said ring member, said larger sized tab member being substantially immovably secured in a respective one of said grooves, and said other two smaller sized tab members being laterally movably secured within corresponding respective ones of said grooves, the inner diameter of said ring member being less than the major diameter of said threaded aperture so that upon insertion of said threaded end of said bolt into the leading end of said body portion and said ring member, the end of said bolt slidably engages said rounded areas in a camming like manner to radially expand said ring member at the slot thereof, thereby causing said ring member to grip the threaded end of said bolt as it enters thereinto, in a brake-band fashion.

7. A lock nut as claimed in claim 6 wherein the edges of said grooves are deformed so as to secure the tab members therein, thereby to prevent axial movement of said ring member upon the insertion of said bolt into the leading end of said body portion.

References Cited

UNITED STATES PATENTS

| | | | |
|---|---|---|---|
| 692,572 | 2/1902 | Wilcox | 151—30 |
| 728,560 | 5/1903 | Foster | 151—30 |
| 832,807 | 10/1906 | Pond | 151—30 |
| 1,400,154 | 12/1921 | Green | 151—15 |

CARL W. TOMLIN, *Primary Examiner.*

R. S. BRITTS, *Assistant Examiner.*